United States Patent [19]

Honda et al.

[11] Patent Number: 4,498,090
[45] Date of Patent: Feb. 5, 1985

[54] ELECTROSTATIC PRINTING APPARATUS

[75] Inventors: Shigemichi Honda, Tokyo; Akio Hitachi, Inagi; Kiyosuke Suzuki, Kitamoto; Kiyotaka Dochi, Tokyo, all of Japan

[73] Assignee: Sony Corporation, Tokyo, Japan

[21] Appl. No.: 349,776

[22] Filed: Feb. 18, 1982

[30] Foreign Application Priority Data

Feb. 18, 1981 [JP] Japan .................................. 56-22392
Feb. 18, 1981 [JP] Japan ............................. 56-21702[U]

[51] Int. Cl.³ ............................................ G01D 15/06
[52] U.S. Cl. ..................................................... 346/159
[58] Field of Search ................ 346/154, 159; 358/300, 358/298–299; 250/326, 426; 361/222, 230

[56] References Cited

U.S. PATENT DOCUMENTS

| | | | |
|---|---|---|---|
| 3,438,053 | 4/1969 | Howell | 346/159 |
| 3,460,156 | 8/1969 | Byrd | 346/159 |
| 3,725,951 | 4/1973 | McCurry | 346/159 |
| 3,961,574 | 6/1976 | Fotland | 101/DIG. 13 X |

FOREIGN PATENT DOCUMENTS

| | | |
|---|---|---|
| 1480588 | 7/1977 | United Kingdom . |
| 2035221 | 6/1980 | United Kingdom . |
| 2042278 | 9/1980 | United Kingdom . |

*Primary Examiner*—Thomas H. Tarcza
*Attorney, Agent, or Firm*—Lewis H. Eslinger; Alvin Sinderbrand

[57] ABSTRACT

An electrostatic printing apparatus of the ion-flow type for printing an image on record paper in response to an information signal includes a corona generator for generating ions; a back electrode over which the paper travels for producing a bias potential to cause the generated ions to flow from the corona generator toward the back electrode onto the recording paper; a control electrode interposed between the corona generator and the back electrode for controlling the flow of ions therebetween and including a plurality of apertures through which the ions are adapted to flow; and a control signal generator for supplying a control signal to the control electrode to cause the latter to control the amount of ion flow through each aperture, in response to the level of the information signal, to a first amount corresponding to an area on the paper which is black, a second amount corresponding to an area on the paper which is white, or at least one other amount corresponding to at least one other area on the paper which is gray, with different shadings available. In one embodiment, the control signal generator supplies the control signal to the control electrode to cause the latter to control the area of ion flow through each aperture and, in another embodiment, the control signal generator supplies the control signal to the control electrode to cause the latter to control the time within which ions flow through each aperture.

6 Claims, 34 Drawing Figures

$T_{CL} = \frac{1}{16} T_0$

FIG.15A CLK

ELECTROSTATIC PRINTING APPARATUS

BACKGROUND OF THE INVENTION

1. Field of the Invention

This invention relates generally to printing apparatus and, more particularly, is directed to an electrostatic printing apparatus of the ion-flow type.

2. Description of the Prior Art

Electrostatic printing apparatus are well-known in the art. For example, one known electrostatic printing apparatus of the ion-flow type includes an ion generator comprised of an insulated, hollow cylinder open along a segment of its length with a corona wire stretched along the axis of the cylinder. A high voltage is applied to the corona wire and ions generated thereby accumulate in the interior of the cylinder. A back electrode over which the recording paper travels is charged with a voltage having an opposite polarity to the voltage applied to the corona wire, and accordingly, an electric field is produced between the ion generator and the back electrode to cause the ions to flow from the former toward the latter and thereby onto the recording paper.

In order to control the placement of the electrostatic charge on the recording paper, a control electrode is interposed between the ion generator and the recording paper and generally includes a plurality of spaced apertures through which the ions are adapted to flow. Upper and lower electrode layers of the control electrode are applied with appropriate potentials to produce a second electric field through each of the apertures. This second electrode field is combined with the aforementioned electric field existing between the ion generator and back electrode to either prevent the flow of ions through selected apertures or to permit the flow of ions through selected apertures. In other words, the flow of ions through each aperture is controlled in a binary or digital manner whereby ions are either permitted or prevented from flowing through each respective aperture. In the case where the apertures are circular, charged dot areas are selectively formed on the recording paper. When the paper is later processed, powder or ink which is charged to have a polarity opposite to the ion charges deposited on the paper are applied to the paper so that the charged dot areas become blackened and the non-charged areas remain the color of the paper.

With the above arrangement, no shading gradations exist between the black and white areas on the paper. In order to obtain different shadings, a plurality of dots, for example, formed in a 4×4 matrix for each pictorial or image element, are used to provide such gradation. Thus, the more dots in each matrix that are blackened, the darker the image element will appear. However, since this method uses a plurality of dots on the paper for each pictorial element to indicate gradations in shading, the resolution of the entire printed image is lowered. The signal processing of such image also becomes difficult. Further, when the speed of advancement of the recording medium is changed or if it is desired to change the resolution of the printed image, the density of the printed dots will change, resulting in a variation in the shading of the entire image.

It is to be noted that generally, the corona wire is arranged parallel and in alignment with the apertures of the control electrode. It has recently been proposed, however, to maintain the corona wire and the control electrode in such parallel arrangement while positioning the control electrode, and the apertures, therein, askew with respect to the corona wire. The purpose of such arrangement is to reduce the displacement pitch between the apertures in the direction of the corona wire to increase the resolution of the printed image in such direction. With such arrangement, however, the distance between the different apertures and the corona wire are different, resulting in the ion flow through each aperture also being different. Consequently, the shading of the recorded image varies in accordance with the distance of each aperture from the corona wire, resulting in a deterioration in the quality of the recorded image.

OBJECTS AND SUMMARY OF THE INVENTION

Accordingly, it is an object of this invention to provide an electrostatic printing apparatus that avoids the above-described difficulties encountered with the prior art.

More particularly, it is an object of this invention to provide an electrostatic printing apparatus of the ion-flow type which is adapted to provide shading of a recorded image.

It is another object of this invention to provide an electrostatic printing apparatus of the ion-flow type in which each dot printed on the recording paper corresponds to one pictorial element and in which the shading of each dot can easily be adjusted.

It is still another object of this invention to provide an electrostatic printing apparatus of the ion-flow type in which the ion flow density through each aperture of the control electrode can be adjusted to maintain the shading of the recorded image during changes in the speed of advancement of the recording paper or when changes in the resolution of the recorded image are made.

It is yet another object of this invention to provide an electrostatic printing apparatus of the ion-flow type in which the ion flow density through each aperture of the control electrode can be adjusted to provide correct shading of the recorded image when the control electrode is positioned askew to the corona wire.

In accordance with an aspect of this invention, an electrostatic printing apparatus of the ion-flow type for printing an image on a record medium in response to an information signal includes ion generator means for generating ions; back electrode means for producing a bias potential to cause the generated ions to flow from the ion generating means toward the back electrode means onto the record medium; control electrode means interposed between the ion generator means and the back electrode means for controlling the flow of ions therebetween and including at least one aperture through which the ions are adapted to flow; and control signal generator means for supplying a control signal to the control electrode means to cause the latter to control the amount of ions flowing through each aperture to one of at least three different amounts in response to the information signal.

The above, and other, objects, features and advantages, of the invention will become readily apparent from the following detailed description of illustrative embodiments of the invention which is to be read in connection with the accompanying drawings.

BRIEF DESCRIPTION OF THE DRAWINGS

FIGS. 15A-15J are waveform diagrams used for explaining the operation of the circuit of FIG. 13.

DETAILED DESCRIPTION OF THE PREFERRED EMBODIMENTS

Figure 1:
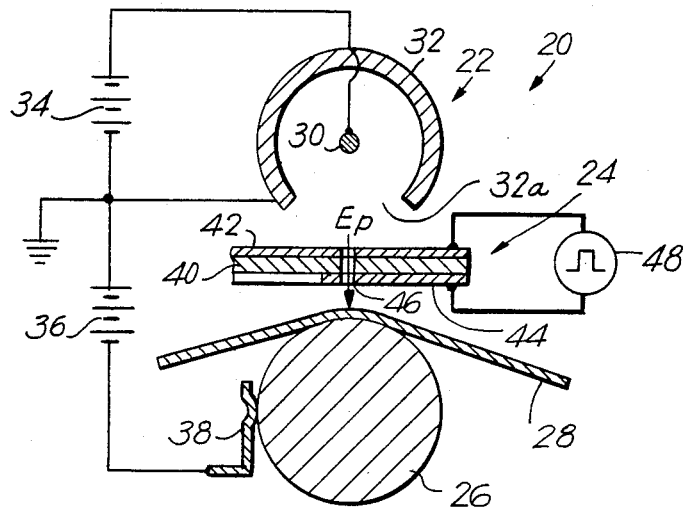
FIG. 1 is a schematic cross-sectional view of an electrostatic printing apparatus according to the prior art.
Figure 2:
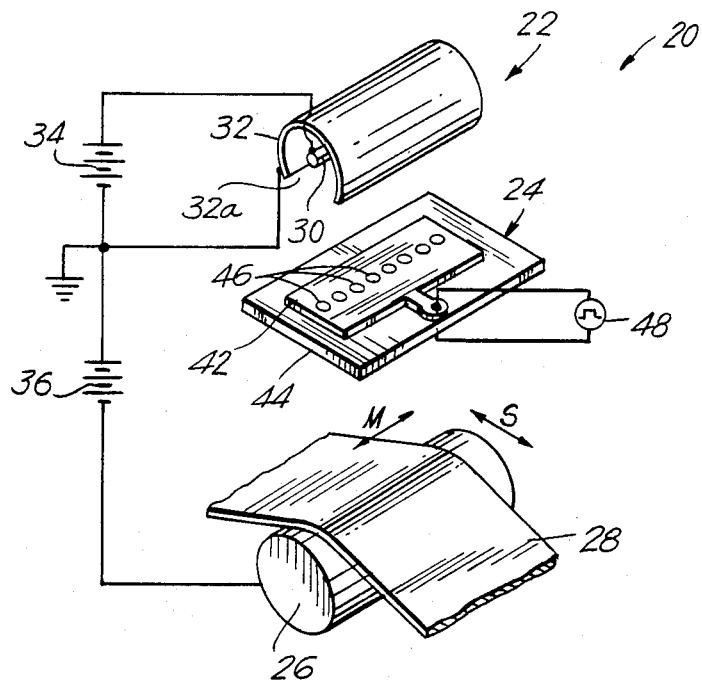
FIG. 2 is a perspective view of the apparatus of FIG. 1.

Referring to the drawings in detail, and initially to FIGS. 1 and 2 thereof, an electrostatic printing apparatus 20 of the ion-flow type according to the prior art includes an ion generator 22 which, in the embodiment of FIGS. 1 and 2 is a corona generator, a control electrode 24 and a metal roller 26 which functions as a back electrode over which the recording paper 28 travels in a sub-scan direction S. Corona generator 22 includes a corona wire 30 stretched along a main-scan direction M which is perpendicular to the aforementioned sub-scan direction S. A cylinder 32 having an opening 32a along a segment of its length surrounds corona wire 30, and is preferably insulated or made of a metal material which is grounded. In order to generate ions necessary for producing an electrostatic potential image on the recording paper, a high voltage, for example, 4-8 kV is applied from a high voltage source 34 to corona wire 30, whereby a so-called corona discharge is produced. The corona discharge is a discharge phenonenon in which the air is partially dielectrically broken down to produce ions and the polarity of the ions obtained from corona generator 22 is equal to the polarity of the high voltage supplied to corona wire 30 from high voltage source 34. For example, when high source 34 supplies a positive voltage of +8 kV to corona wire 30, a positive ion is generated by corona generator 22.

In order to cause the generated ions to travel or flow onto recording paper 28, a voltage, generally one having a polarity opposite to the voltage supplied to corona wire 30, is supplied to metal roller 26 from a high voltage source 36 through a connecting member 38. For example, a negative voltage of −3 kV can be supplied to metal roller 26. Accordingly, an electric field $E_p$ is formed in the direction from corona generator 22 to metal roller 26. In this manner, positive ions from corona generator 22 are caused to flow by the electric field $E_p$ through the opening 32a of cylinder 32 toward metal roller 26. It is to be appreciated that cylinder 32 may assume various configurations, for example, cylinder 32 is shown to have a U-shaped configuration, as long as the opening 32a therein is positioned in an opposing relation to metal roller 26. Further, the polarity of the voltages supplied to corona wire 30 and back roller 26 may be reversed whereby negative ions from corona generator 22 would effectively flow from corona generator 22 to back roller 26. In such case, the direction of the electric field $E_p$ would be reversed.

Figure 3A:
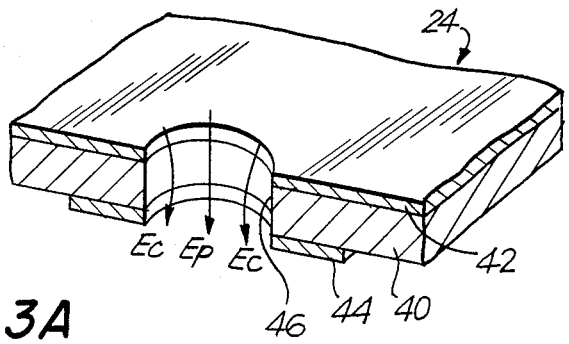
FIGS. 3A and 3B are perspective views of a portion of the control electrode of FIG. 1, illustrating the electric fields created within an aperture of the control electrode.
Figure 3B:
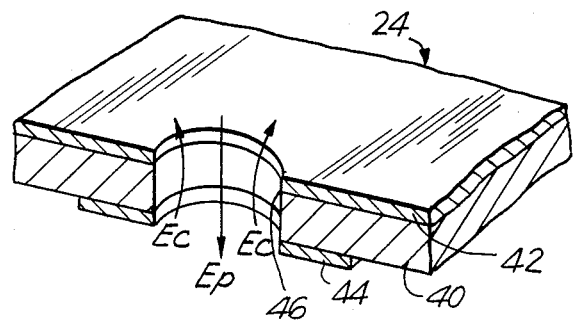
Figure 4:
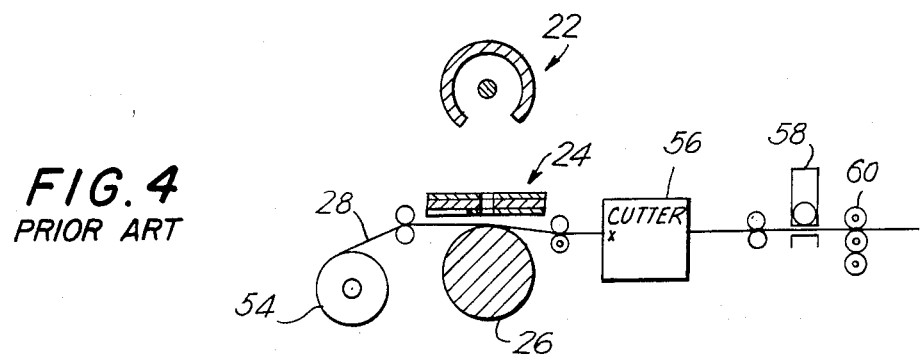
FIG. 4 is a schematic, partial cross-sectional view of an overall printing apparatus of the electrostatic type.

Control electrode 24 is positioned approximately midway in the ion-flow route between corona generator 22 and metal roller or back electrode 26 to control the ion flow onto recording paper 28. In particular, control electrode 24 includes a dielectric plate 40, for example, of polyamide resin, having both of its surfaces coated by metallic electrode layers 42 and 44, respectively A plurality of small apertures 46 are formed in a spaced apart, linear array in the main-scan direction M and are in vertical alignment with corona wire 30. In other words, the linear array of apertures 46 is arranged in a plane parallel to corona wire 30 and is in linear alignment therewith. A differential voltage from a control voltage source 48 is applied between metallic electrode layers 42 and 44 to form a control electric field $E_c$ inside each aperture 46 to control the ion flow therethrough. The apparatus works in a digital or binary manner such that ions are either permitted to flow or not permitted to flow through apertures 46. In other words, the amount of ion flow through the apertures is controlled to one of two amounts, that is, a zero amount and a predetermined amount, and is not adjustable. For example, as shown in FIG. 3A, if the control electric field $E_c$ is formed in the same direction as that of the main electric field $E_p$ within an aperture 46, the ions from corona generator 22 pass through such aperture 46 toward back electrode 26 and thereby onto recording paper 28. However, if the control electric field $E_c$ is in opposing relation to main electric field $E_p$, as shown in FIG. 3B, the ion flow therethrough is cut off entirely.

Figure 5:
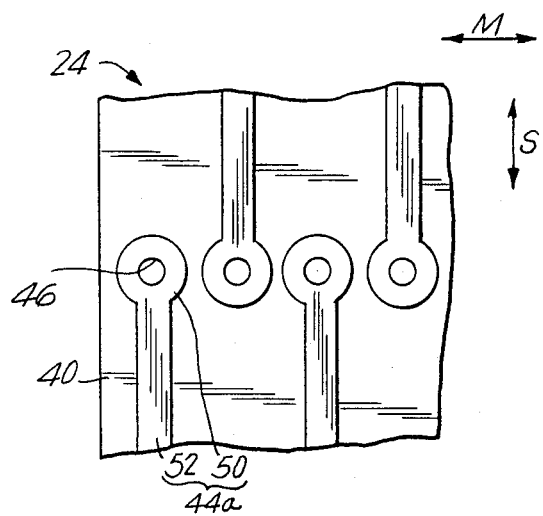
FIG. 5 is a bottom plan view of a portion of the control electrode of FIG. 1.

In actuality, the control electric field $E_c$ in each of the plurality of apertures 46 is independently controlled. For example, electrode layer 42 may be constructed as a common electrode layer to all apertures 46 and electrode layer 44 may be constructed as a plurality of independent electrode layers $44a \ldots 44n$, as shown in FIG. 5. In this manner, the voltage supplied to electrode layers $44a$-$44n$ can be controlled to vary the control electric field $E_c$ for each respective aperture 46 For example, as shown in FIG. 5, each control electrode layer 44 may include a land portion 50 surrounding the respective aperture 46 and a wiring portion 52 for supplying a control voltage to the respective land portion. Thus, if 100 V is supplied to common electrode layer 42, voltages of 0 V or 200 V can independently be applied to each land portion 50 to permit ion flow through the respective aperture 46 or to cut off such flow independently of the other apertures.

In operation, recording paper 28 is advanced from a roll of paper 54 over and in contact with back electrode 26 such that the area of contact is positioned in opposing relation to each of apertures 46 of control electrode 24, and the control electric field $E_c$ for each aperture 46 is individually controlled to permit ion flow through selected ones of apertures 46. Consequently, small regions, such as dot areas, are formed on recording paper 28 opposite each selected aperture 46. In this manner, a two-dimensional electrostatic latent image is formed on recording paper 28 by the aforementioned arrangement. Recording paper 28 is then advanced to a cutting device 56 where it is cut into desired sizes. The paper is then advanced to a developing machine 58 in which toner or ink which is charged to a polarity opposite to that of the electrified charge of the electrostatic latent image on recording paper 28 is deposited on and attached to recording paper 28. Recording paper 28 is then advanced to a fixing machine 60 which fixes the toner or ink to recording paper 28 by, for example, pressure, to produce a visible image on recording paper 28.

Figure 6:
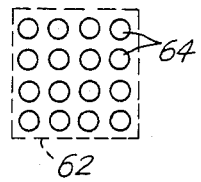
FIG. 6 is a schematic diagram of a dot matrix arrangment printed with the prior art electrostatic printing apparatus of FIG. 1.
Figure 7A:
FIGS. 7A-7D are schematic diagrams of the dot matrix arrangement of FIG. 6, with different shading gradations printed.
Figure 7B:
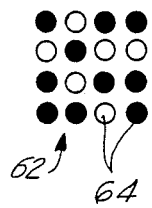
Figure 7C:
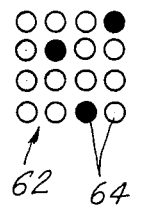
Figure 7D:
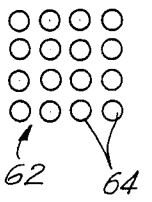

It is to be appreciated that, with the above arrangement according to the prior art, a binary or digital recording method is utilized in which each dot printed on recording paper 28 can be either completely darkened or not darkened at all. Although any darkening color or colors can be used, hereinafter it will be assumed that the darkened state is black and the non-darkened state is white, the latter corresponding to the color of the paper In order to achieve various shadings or shading gradations in the printed image, each pictorial or image element 62 is printed as a matrix of dots or cells 64, for example, by a 4×4 square 16 cell matrix, as shown in FIG. 6. The gradation of shading is achieved by the number of cells 64 which are darkened by toner or ink, that is, which are electrostatically charged. For example, a completely black pictorial element would be produced by darkening all of the cells 64 in matrix 62, as shown in FIG. 7A while, on the other hand, a totally white pictorial element would have none of the cells 64 darkened, as shown in FIG. 7D. In order to produce gray areas with different shading gradations, the number of cells 62 in a matrix 64 that are darkened are varied, as shown in FIGS. 7B and 7C, in which the pictorial element of FIG. 7B is viewed with a darker shade then that of FIG. 7C but with a lighter shade than that of FIG. 7A. It is to be appreciated, however, that with the above method, a plurality of cells are used for each pictorial or image element to express various gradations in shading, and accordingly, the resolution of the printed image is lowered, and the circuitry for performing such method also becomes relatively complicated. Further, in a binary or digital electrostatic printing apparatus, if the speed of advancement of the recording paper is changed or if it is desired to vary the resolution of the image, for example, by varying the number of cells 64 in each matrix 62, the density of the printed dots or cells will change, resulting in a consequent change in the average shading of the entire printed image.

Figure 8:
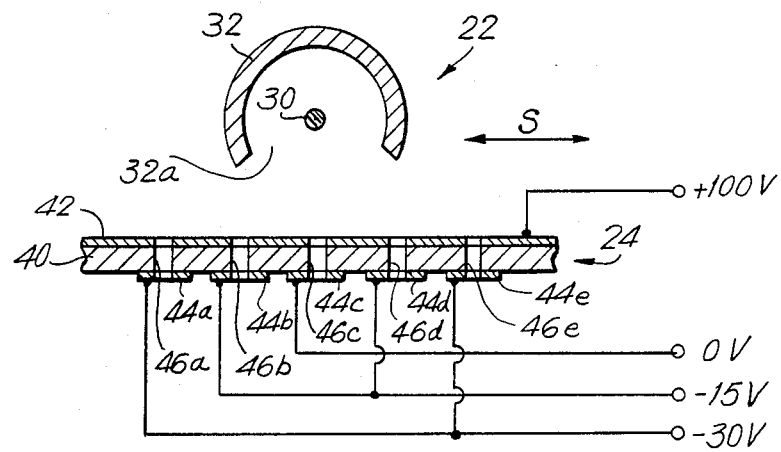
FIG. 8 is a cross-sectional view of a portion of a control electrode proposed to increase the resolution of the printed image.
Figure 9:
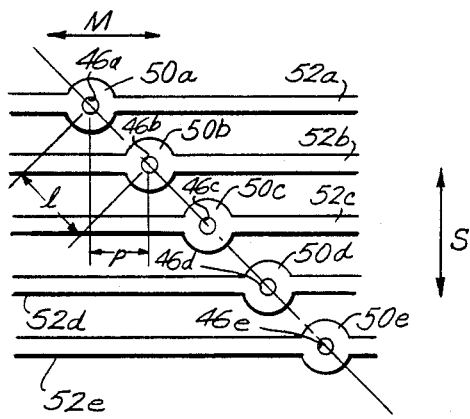
FIG. 9 is a plan view of a portion of the control electrode of FIG. 8.

It has also been proposed to modify the abovedescribed electrostatic printing apparatus according to the prior art by arranging the linear array of apertures 46 askew with respect to corona wire 30, as shown in FIGS. 8 and 9. The purpose of such arrangement is to reduce the displacement pitch p in the main-scan direction M, that is, the distance between the centers of adjacent apertures 46 in the main-scan direction M, while increasing the actual displacement pitch l between adjacent apertures 46 in order to increase the resolution of the printed image in the main-scan direction M. In order to better understand this arrangement, five apertures 46a-46e are shown in FIGS. 8 and 9. With this arrangement, corona wire 30 is positioned directly over central aperture 46c and is parallel to and in linear alignment with wiring portion 52c associated therewith. Because of the skew arrangement of apertures 46a-46e, corona wire 30 is displaced from the remaining apertures 46a, 46b, 46c and 46d, that is, corona wire 30 is not positioned directly over these apertures as with aperture 46c. Accordingly, the ion flow density through each of apertures 46a, 46e; 46b, 46d; and 46c are different. Consequently, less electrostatic charge is deposited on recording paper 28 at positions corresponding, for example, to aperture 46a, than at positions corresponding to aperture 46c. This of course, results in a deterioration in the quality of the printed image.

Figure 10:
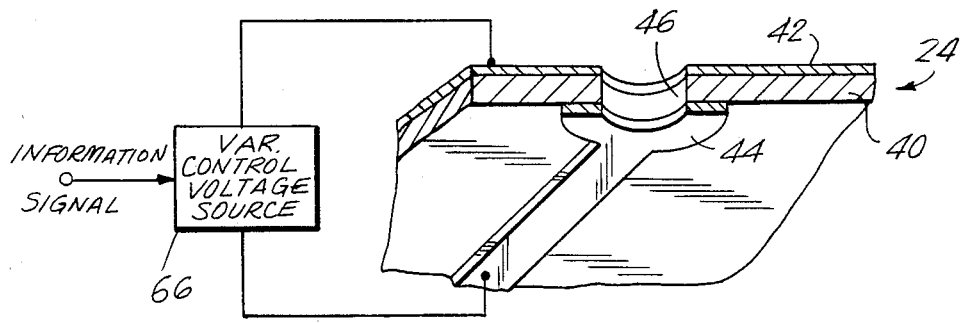
FIG. 10 is a perspective view of a portion of a control electrode assembly according to one embodiment of this invention.
Figure 11A:
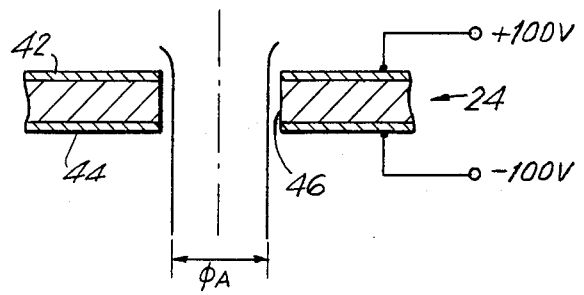
FIGS. 11A-11C are schematic cross-sectional views of a portion of the control electrode assembly of FIG. 10.
Figure 11B:
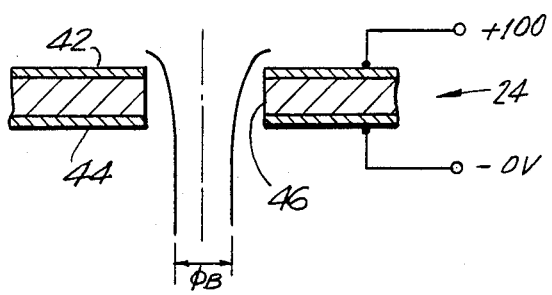
Figure 11C:
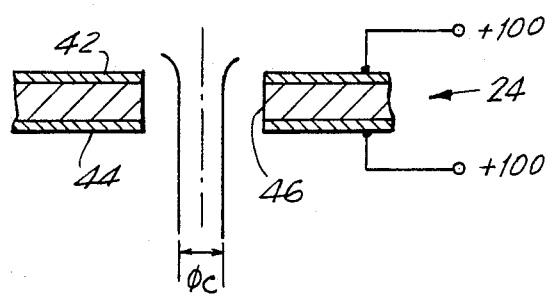

Referring now to FIGS. 10–12, it will be seen that, in an electrostatic printing apparatus of the ion-flow type according to one embodiment of this invention, elements corresponding to those described above with reference to the prior art apparatus of FIGS. 1–5 and the proposed modification of such apparatus, as shown in FIGS. 8 and 9, are identified by the same reference numerals and a detailed description thereof will be omitted for the sake of brevity. In the electrostatic printing apparatus according to the first embodiment of this invention, a differential control voltage is applied between common metallic electrode layer 42 and each independent metallic electrode layer 44 by a variable control voltage source 66 which provides each differential voltage corresponding to the level of an information signal supplied thereto. For example, variable control voltage sources 66 can supply a voltage of +100 V to a common metallic electrode layer 42 while varying the voltage supplied to each metallic electrode layer 44 in accordance with the information signal. By varying the voltage supplied to each metallic electrode layer 44, the electric field $E_c$ within each respective aperture 46 will vary in accordance with the level of the information signal which, in turn, will result in changes in the diameter of the ion flow through the respective apertures 46, as shown in FIGS. 11A–11C. For example, as shown in FIGS. 11A–11C, when a voltage of +100 V is applied to common metallic electrode layer 42, the diameter of the ion flow through an aperture 46 will assume values of $\phi_A$, $\phi_B$, and $\phi_C$ when voltages of −100 V, 0 V and +100 V are applied to the metallic electrode layer 44.

Figures 12A, 12B, 12C, 12D, 12E:
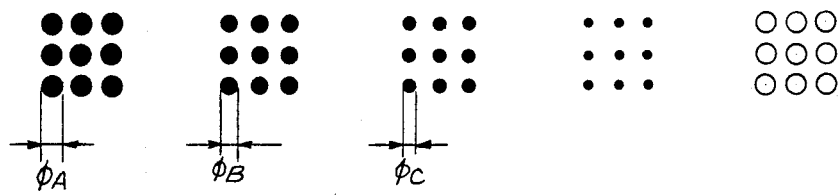
FIGS. 12A-12E are schematic diagrams used for explaining the gradations in shading recorded with the apparatus in FIGS. 11A-11C.

It should be appreciated that the area on recording paper 28 on which the electrostatic charge is deposited corresponds to the area of the ion flow through the respective aperture 46. For example, where the ion-flow through aperture 46 is circular having a diameter $\phi_A$, the electrostatic charge will be deposited on paper 28 in a circular area also having a diameter substantially equal to $\phi_A$, as shown in FIG. 12A. In this manner, various shading gradations can be obtained, with each cell or dot area on recording paper 28 corresponding to one pictorial element. For example, the shading of each dot or cell in FIG. 12A is darker then that in FIG. 12B which, in turn, is darker than that in FIG. 12C, and so on. Variable control voltage source 66 preferably controls the voltage supplied to each metallic electrode layer 44 in a continuous manner in response to the level of the information signal. It should be appreciated, however, that such voltage may be controlled in discrete steps, as long as more than two different voltages can be applied. In other words, if a first voltage corresponding to a totally black dot is provided and a second voltage is provided which completely blocks the ion flow so that no ions pass through an aperture 46, at least a third voltage must be provided intermediate the other two voltages to provide different shading gradations.

Accordingly, it should be appreciated that the present invention overcomes the aforementioned problems encountered in the prior art. In particular, the present invention provides that each pictorial element of the image is represented by a single cell or dot with each cell or dot being capable of providing different shading gradations. Thus, there is no need to provide a large matrix to provide such shading gradations and the resolution of the printed image is vastly improved. Also, if the resolution is changed or the recording paper is advanced at a different speed, variable control voltage source 66 can correspondingly vary the voltages supplied to each metallic electrode layer 44 to prevent the shading of the entire image from being changed. For example, if the density of the dots or cells is doubled, the average shading of the entire printed image can be maintained constant by reducing the amplitude of the control electric field for each printed dot by one-half. This has particular applicability for the printing of a photographic picture. In addition, for the proposed electrostatic printing apparatus of FIGS. 8 and 9, the amplitude of the control electric field $E_c$ can be changed corresponding to the position of each of apertures 46a–46e from corona wire 30 such that the ion flow through each of apertures 46a–46e is made equal. Thus, the total electric field in apertures 46a and 46e can be increased relative to the total electric field within apertures 46b and 46d which, in turn, can be increased relative to the total electric field in aperture 46c. For example, with a voltage of +100 V supplied to common metallic electrode layer 42, the control voltages supplied to metallic electrode layers 44a, 44e; 44b, 44d; and 44c can be $-30$ V; $-15$ V; and 0 V, respectively, as shown in FIG. 8. Thus, the differential control voltages produced for apertures 44a, 44e; 44b, 44d; and 44c are 130 V; 115 V and 100 V, respectively, to equalize the ion flow through such apertures. In this manner, the quality of the printed picture does not deteriorate. It should be appreciated that additional voltages corresponding to different desired shading gradations can be added to the aforementioned voltages illustrated in FIG. 8 to provide variable shading of the printed image.

Figure 13:
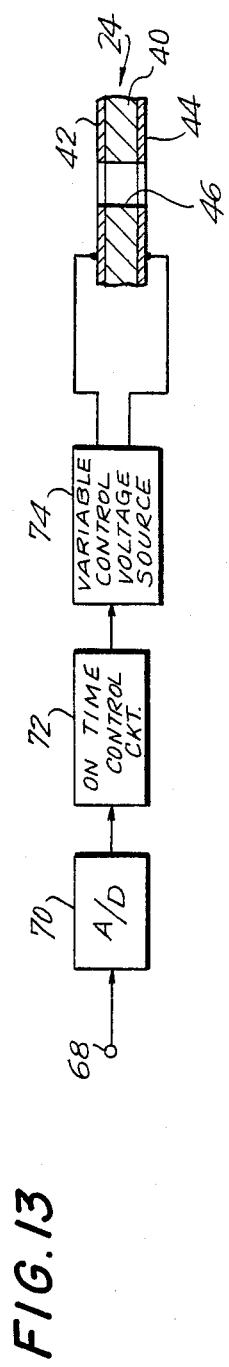
FIG. 13 is a block diagram of a control signal generator and a cross-sectional view of a portion of a control electrode according to a second embodiment of this invention.
Figure 14:
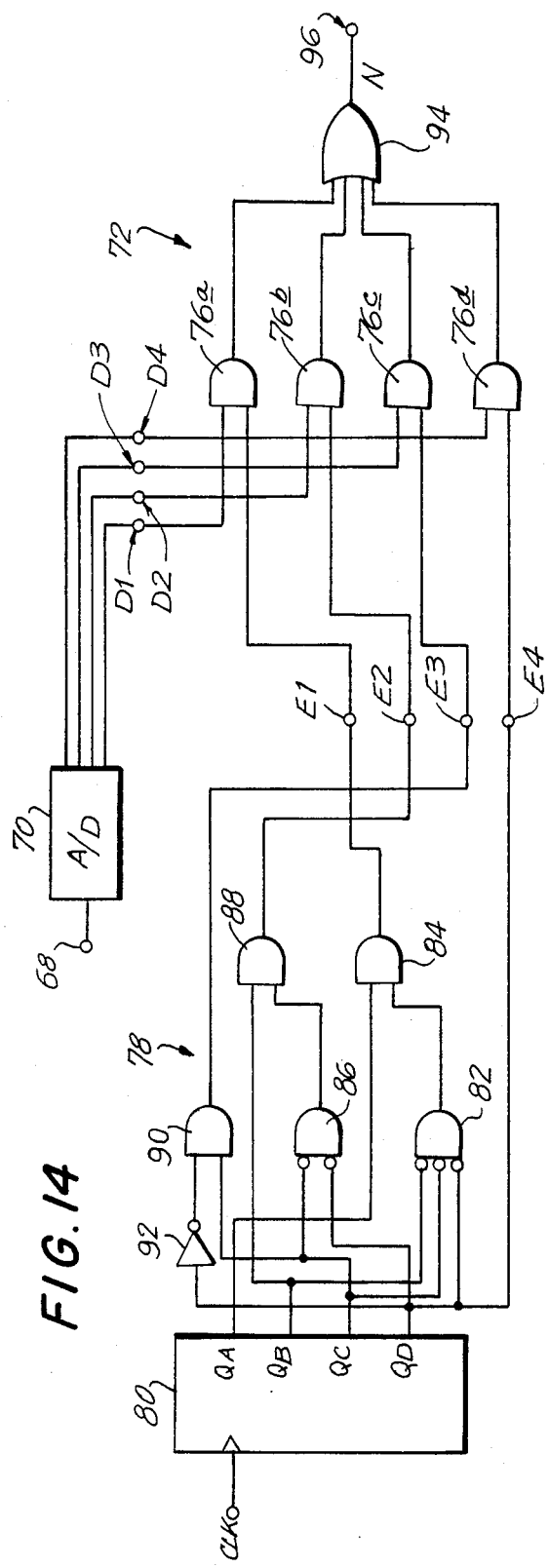
FIG. 14 is a detailed block diagram of the ON time control circuit of FIG. 13.

Referring now to FIGS. 13 and 14, there is shown a control signal generator for an electrostatic printing apparatus of the ion-flow type according to another embodiment of this invention in which elements corresponding to those described above with reference to the apparatus of FIGS. 1–5 are identified by the same reference numerals and a detailed description thereof will be omitted for the sake of brevity. The apparatus of FIGS. 13 and 14, rather than controlling the diameter of ion flow through each aperture 46, controls the amount of time that a constant flow of ions passes through each aperture 46. Thus, whereas the electrostatic printing apparatus according to the first embodiment of this invention, as shown in FIGS. 10–12, controls the area on recording paper 28 in which ions are deposited during a fixed time period, the electrostatic printing apparatus according to the second embodiment of this invention provides a constant area in which the ions are deposited but controls the length of time within which such ions are deposited in each constant or fixed dot area on recording paper 28.

Generally, in accordance with the second embodiment of this invention, an information signal which contains data regarding the shading gradations of the image to be printed is supplied from an input terminal 68 to an analog-to-digital (A/D) converter 70 where it is sampled and converted to, for example, 4-bit digital information. The digitized information signal is supplied from A/D converter 70 to an ON time control circuit 72 which, in response to the digitized information signal, supplies a control signal to a variable control voltage source 74 which supplies a differential voltage to metallic electrode layers 42 and 44 for each aperture 46. In particular, the control signal from ON time control circuit 72 controls the time within which variable control source 74 provides a differential voltage to metallic electrode layers 42 and 44 to permit ion flow through selective apertures 46.

Referring to FIG. 14, a detailed diagram of an ON time control circuit 72 according to one embodiment of this invention includes four two-input AND gates 76a, 76b, 76c, and 76d, with one of the inputs of each being connected to the output of A/D converter 70 and the other input of each being connected to the output of a logic circuit 78. The latter circuit includes a divide-by-16 counter 80 supplied with a clock signal CLK (FIG. 15A) and, in turn, repeatedly counts sixteen clock pulses $T_{CL}$ from 0 to 15 in binary for each period $T_O$. Accordingly, four outputs $Q_A$, $Q_B$, $Q_C$ and $Q_D$ are provided as the outputs of counter 80. Logic circuit 78 includes circuitry between the output of counter 80 and the input of AND gates 76 for producing four reference time signals $E_1$, $E_2$, $E_3$, $E_4$, as shown in FIGS. 15I, 15H, 15G and 15F, having respective time periods $T_1$, $T_2$, $T_3$ and $T_4$ corresponding to $2^0$, $2^1$, $2^2$ and $2^3$ cycle periods $T_{CL}$ of clock signal CLK. In other words, $$T_1:T_2:T_3:T_4 = 2^0:2^1:2^2:2^3 \qquad (1)$$
$$= 1:2:4:8$$

Further, each of reference time signals $E_1$–$E_4$ is produced in a non-overlapping manner. In this regard, it is to be appreciated that the selective addition of each of reference time signals $E_1$–$E_4$ by the digitized information signal from A/D converter 70 will result in selected apertures 46 permitting ion flow therethrough for desired amounts of time The circuitry for producing reference time signals $E_1$–$E_4$ from the outputs of counter 80 is designed to operate as follows:

$$E_1 = Q_A \cdot \overline{Q_B} \cdot \overline{Q_C} \cdot \overline{Q_D} \qquad (2)$$

$$E_2 = Q_B \cdot \overline{Q_C} \cdot \overline{Q_D} \qquad (3)$$

$$E_3 = Q_C \cdot \overline{Q_D} \qquad (4)$$

$$E_4 = Q_D \qquad (5)$$

In particular, to produce reference time signal $E_1$, the output signals from terminals $Q_B$, $Q_C$ and $Q_D$ are supplied to respective inputs of a NOR gate 82 which, in turn, supplies an output to an AND gate 84. The $Q_A$ output is supplied to the other input of AND gate 84 which produces reference time signal $E_1$ at its output, as shown in FIG. 15I, having a reference time period $T_1$ equal to one cycle period $T_{CL}$ of clock signal CLK. To produce reference time signal $E_2$, the $Q_C$ and $Q_D$ outputs from counter 80 are supplied to respective inputs of a two-input NOR gate 86. The $Q_B$ output is supplied to one input of an AND gate 88 and the output of NOR gate 86 is supplied to another input of AND gate 88, the latter of which produces reference time signal $E_2$ having a reference time period $T_2$ equal to two cycle periods $T_{CL}$ of clock signal CLK. To produce reference time signal $E_3$, the $Q_C$ output is supplied to one input of an AND gate 90 and the other input thereof is supplied with the $Q_D$ output through an inverter 92, the output of AND circuit 90 constituting reference time signal $E_3$. Lastly, the reference time signal $E_4$ is obtained directly from the $Q_D$ output of counter 80. It is to be appreciated that the selective addition of reference time signals E1–E4 can be controlled by the information signal to vary the ON time of control electrode 22 such that ion flow through each aperture 46 can be controlled in accordance with the information signal. To this end, the 4-bit digitized signal from A/D converter 70, which corresponds to the required shading for the printed image, is produced along four lines as bit signals D1, D2, D3 and D4 (FIGS. 15E, 15D, 15C, and 15B) which are supplied to respective AND gates 76a, 76b, 76c and 76d of ON time control circuit 72. The reference time signals E1, E2, E3 and E4 are also supplied to respective AND gate 76a, 76b, 76c and 76d which, in response to the signals supplied thereto, supply output signals to respective inputs of a 4-input OR gate 94 where they are combined. It is to be appreciated, therefore, that the bit signals D1–D4 gate selected ones of the reference time signals E1–E4 to OR gate 94 for each dot or cell to be printed on recording paper 28. Accordingly, the output N from OR gate 94 corresponds to the time in which ion flow is permitted through each respective aperture 46 and is produced at an output terminal 96 of ON time control circuit 72. ON time signal N is supplied to variable control voltage source 74 which operates in two modes, that is, an ON mode in which constant ion flow is permitted through an aperture 46 and an OFF mode in which no ion flow is permitted through the respective aperture 46.

Accordingly, during operation, recording paper 28 is intermittently advanced corresponding to time period $T_O$ and the time within which ions flow through respective ones of apertures 46 is controlled by ON time control circuit 72 in response to the 4-bit digitized information signal from A/D converter 70. It is to be appreciated that the longer that the ion flow is permitted through an aperture 46, the greater the electrostatic charge that will be deposited on a dot or cell area on recording paper 28, and consequently, the darker the shading that will result during the later developing process. As an example, during one time period $T_O$ from time $t_1$ to $t_2$, as shown in FIG. 15J, if the 4-bit digitized information signal is "0101" as shown in FIGS. 15B–15E, only AND gates 76a and 76c are activated to transmit reference time signals E1 and E3, respectively. Accordingly, the amount of time that ions are permitted to flow through an aperture 46, that is, the ON time $T_N$, is as follows: $T_N=T_1+T_3=5T_{CL}$. Similarly, during another time period $T_O$ from time $t_2$ to time $t_3$, if the 4-bit digitized information signal is equal to "1011", AND gates 76a, 76b and 76d are activated to transmit reference time signals E1, E2, and E4, respectively, to obtain an ON time period $T_N=T_1+T_2+T_4=11T_{CL}$. It is to be appreciated that sixteen different gradations of shading can be achieved for each dot with this second embodiment. However, this may readily be varied by changing the number of clock pulses $T_{CL}$ in each period $T_O$ and providing additional circuitry.

The electrostatic printing apparatus according to the second embodiment of this invention also overcomes the problems inherent in prior art electrostatic printing apparatus and the proposed modification thereto. In particular, with the electrostatic printing apparatus according to the second embodiment of this invention, each dot or cell printed on recording paper 28 corresponds to one pictorial element and shading of that one dot can be easily performed by varying the amount of time that ions are permitted to flow through each aperture 46. Further, any changes in the average shading of the entire printed image can be prevented, for example, when resolution of the image is changed or when the speed of advancement of the recording paper is changed, by merely varying the ON time of each aperture 46. In addition, for the aforementioned proposed electrostatic printing apparatus of FIGS. 8 and 9, the ON time for apertures 46a and 46e can be increased relative to the ON time for apertures 46b and 46d which, in turn, can be increased relative to the ON time for aperture 46c. In other words, the ON time for each aperture is increased the further that aperture is positioned away from corona wire 30. In this manner, ion flow through each of the apertures can be regulated so that uniform shading can be achieved Having described specific preferred embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Electrostatic printing apparatus of the ion-flow type for printing an image on a record medium in response to an information signal, comprising:

ion generator means for generating ions;

back electrode means for producing a bias potential to cause said generated ions to flow from said ion generator means toward said back electrode means onto said record medium;

means for intermittently advancing said record medium past said back electrode means;

control electrode means interposed between said ion generator means and said record medium for controlling the flow of ions therebetween and including at least one aperture, defined by a surrounding surface, and through which said ions are adapted to flow; and control signal generator means for supplying a control signal to said control electrode means to cause the latter to produce an electric field substantially parallel to said bias potential in order to direct the flow of said ions through said at least one aperture in a stream substantially out of contact with said surrounding surface, and to control the amount of said ions flowing through each aperture to one of at least three different amounts in response to said information signal, said control signal generator means supplying said control signal to said control electrode means so as to cause the latter to control the time, during each interval when the intermittently advanced record medium is at rest, within which ions flow through each aperture to one of at least three different times in response to said information signal.

2. Electrostatic printing apparatus according to claim 1; in which said control signal generator means includes variable control signal means for supplying said control signal to said control electrode means, and ON time control means for supplying an ON time signal to said variable control signal means so that the latter causes the control electrode means to control the time within which ions flow through each aperture.

3. Electrostatic printing apparatus according to claim 1; in which said control signal generator means further includes reference generator means for generating reference time signals; and said ON time control means produces said ON time signal in response to said reference time signals and said information signal.

4. Electrostatic printing apparatus according to claim 1; in which said reference generator means includes counter means for producing count output signals in response to a clock signal supplied thereto, and logic means for producing said reference time signals in response to said count output signals.

5. Electrostatic printing apparatus according to claim 1; in which said ON time control means includes gating means for gating selected ones of said reference time signals in response to said information signal, and combining means for combining said gated reference time signals to produce said ON time signal.

6. Electrostatic printing apparatus according to claim 1; in which said control signal generator means further includes means for converting said information signal to digital form corresponding to the level of said information signal; and said ON time control means produces said ON time signal in response to said reference time signals and said digitized information signal.

* * * * *